(12) United States Patent
Eleftheriou

(10) Patent No.: US 9,784,134 B2
(45) Date of Patent: Oct. 10, 2017

(54) GAS TURBINE ENGINE INLET ASSEMBLY AND METHOD OF MAKING SAME

(71) Applicant: Pratt & Whitney Canada Corp., Longueuil (CA)

(72) Inventor: Andreas Eleftheriou, Woodbridge (CA)

(73) Assignee: PRATT & WHITNEY CANADA CORP., Longueuil, Quebec (*) Notice: Subject to any disclaimer, the term of this patent is extended or adjusted under 35 U.S.C. 154(b) by 955 days.

(21) Appl. No.: 14/036,994

(22) Filed: Sep. 25, 2013

(65) Prior Publication Data

US 2015/0086352 A1 Mar. 26, 2015

(51) Int. Cl.
| | |
|---|---|
| F04D 29/44 | (2006.01) |
| F01D 25/28 | (2006.01) |
| F02C 7/04 | (2006.01) |
| F02C 7/042 | (2006.01) |

(52) U.S. Cl.
CPC ............ F01D 25/28 (2013.01); F02C 7/04 (2013.01); F02C 7/042 (2013.01); *F05D 2230/237* (2013.01); *F05D 2230/60* (2013.01); *F05D 2230/64* (2013.01); *Y10T 29/4932* (2015.01)

(58) Field of Classification Search
CPC ............ F01D 25/28; F01D 9/044; F02C 7/04
See application file for complete search history.

(56) References Cited

U.S. PATENT DOCUMENTS

| | | | |
|---|---|---|---|
| 3,708,242 A * | 1/1973 | Bruneau ................. | F01D 9/044 415/200 |
| 3,721,460 A | 3/1973 | Holman et al. | |
| 5,160,251 A * | 11/1992 | Ciokajlo ................ | F01D 25/162 415/142 |
| 8,001,792 B1 | 8/2011 | Dvorak et al. | |
| 8,061,982 B2 | 11/2011 | Twell | |
| 8,402,741 B1 | 3/2013 | Merry et al. | |
| 8,469,661 B2 * | 6/2013 | Durocher ............... | F01D 9/044 415/209.2 |
| 8,720,060 B2 * | 5/2014 | Headland .............. | F01D 9/023 29/889.2 |
| 2010/0275572 A1 | 11/2010 | Durocher et al. | |

FOREIGN PATENT DOCUMENTS

| | | |
|---|---|---|
| EP | 0079216 | 5/1983 |
| WO | 2013127901 | 9/2013 |

* cited by examiner

*Primary Examiner* — Craig Kim
*Assistant Examiner* — Jason Fountain
(74) *Attorney, Agent, or Firm* — Norton Rose Fulbright Canada

(57) ABSTRACT

A method of fabricating an inlet assembly for a gas turbine engine, the method including defining an intake duct of the inlet assembly between first and second space apart inlet case portions, locating at least one strut across the intake duct, each strut having a proximal end made integral to the first inlet case portion and an opposed distal end engaged in a respective strut-receiving aperture defined through the second inlet case portion, while maintaining the distal end of each strut in the respective strut-receiving aperture, adjusting the relative position of the first inlet case portion and the second inlet case portion until a predetermined throat dimension of the intake duct is obtained, and locking the adjusted relative position by attaching the second inlet case portion to each strut. An inlet assembly and gas turbine engine with inlet assembly as also disclosed.

21 Claims, 3 Drawing Sheets

GAS TURBINE ENGINE INLET ASSEMBLY AND METHOD OF MAKING SAME

TECHNICAL FIELD

The application relates generally to gas turbine engines and, more particularly, to inlet cases thereof.

BACKGROUND OF THE ART

It is generally known to provide gas turbine engine inlet cases as a single cast metal component, typically of an aluminum/magnesium alloy or another lightweight metal. Assembly of the inlet case with other components is generally done with fasteners.

Although cast inlet cases may allow to achieve acceptable weight and durability, the process of casting typically makes it difficult to precisely manage tolerances on specific dimensions of the cast. Consequently an internal dimension of the air passage formed by the inlet case or throat may vary from unit to unit in engines of a same model. Variations in the throat dimension of the inlet case may adversely affect the engine performance and/or lead to engine performance variations between different units of the same engine model.

SUMMARY

In one aspect, there is provided a method of fabricating an inlet assembly for a gas turbine engine, the method comprising: defining an intake duct of the inlet assembly between first and second space apart inlet case portions; locating at least one strut across the intake duct, each strut having a proximal end made integral to the first inlet case portion and an opposed distal end engaged in a respective strut-receiving aperture defined through the second inlet case portion; while maintaining the distal end of each strut in the respective strut-receiving aperture, adjusting the relative position of the first inlet case portion and the second inlet case portion until a predetermined throat dimension of the intake duct is obtained; and locking the adjusted relative position by attaching the second inlet case portion to each strut.

In a second aspect, there is provided an inlet assembly for a gas turbine engine, the inlet assembly comprising: at least first and second spaced apart inlet case portions defining an intake duct therebetween; and at least one strut extending across the intake duct and having a proximal end made integral to the first inlet case portion and a distal end engaged in a respective strut-receiving aperture defined through the second inlet case portion, a relative position of the first and second inlet case portions being fixed through a connection between each of the at least one strut and the second inlet case portion, a length of a portion of each of the at least one strut extending between the inlet case portions controlling a throat dimension of the intake duct.

In a third aspect, there is provided a gas turbine engine comprising: an inlet assembly including at least first and second spaced apart inlet case portions defining an intake duct therebetween; and at least one strut extending across the intake duct and having a proximal end made integral to the first inlet case portion and a distal end engaged in a respective strut-receiving aperture defined through the second inlet case portion, a relative position of the inlet case portions being fixed through a connection between each of the at least one strut and the second inlet case portion, a length of a portion of each of the at least one strut extending between the inlet case portions controlling a throat dimension of the intake duct.

DESCRIPTION OF THE DRAWINGS

Reference is now made to the accompanying figures in which.

DETAILED DESCRIPTION

As described herein, control of the inlet throat dimension can be achieved in an inlet assembly having at least two components connected to one another via one or more struts. The strut(s) can be made integral to one of the two components, i.e. manufactured integrally therewith in a monolithic manner or connected thereto. The other one of the two components has a respective strut-receiving aperture defined therein for each strut, in which the free (distal) end of the strut is engaged. Once the distal end of the strut is engaged into the strut-receiving aperture, the relative position and orientation of the two components can be precisely controlled, adjusted as required, and locked into position through connection of the distal end of the strut(s) to the other component. In a particular embodiment, the two components and the strut(s) are made of a weldable material and each strut is connected to the components through welding.

In a particular embodiment, the increase in weight which may be caused by the use of weldable materials heavier than materials used for typical cast inlet cases is alleviated at least in part by a weight reduction brought by the assembly of the inlet case to adjacent components of the engine through welding instead of fasteners.

Figure 2:
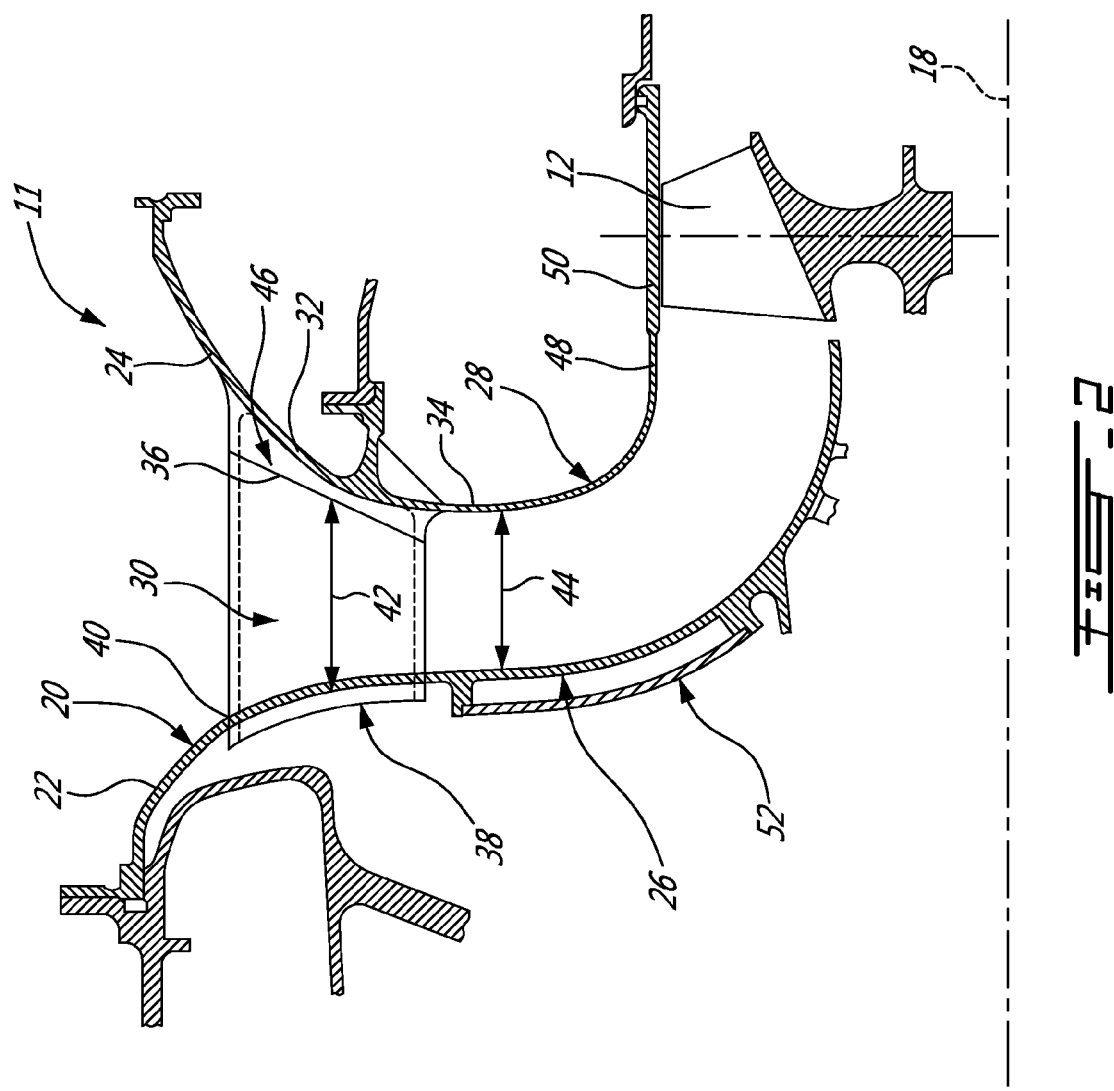
FIG. 2 is a cross-sectional view of an inlet section of a gas turbine engine, in accordance with a first embodiment.
Figure 3:
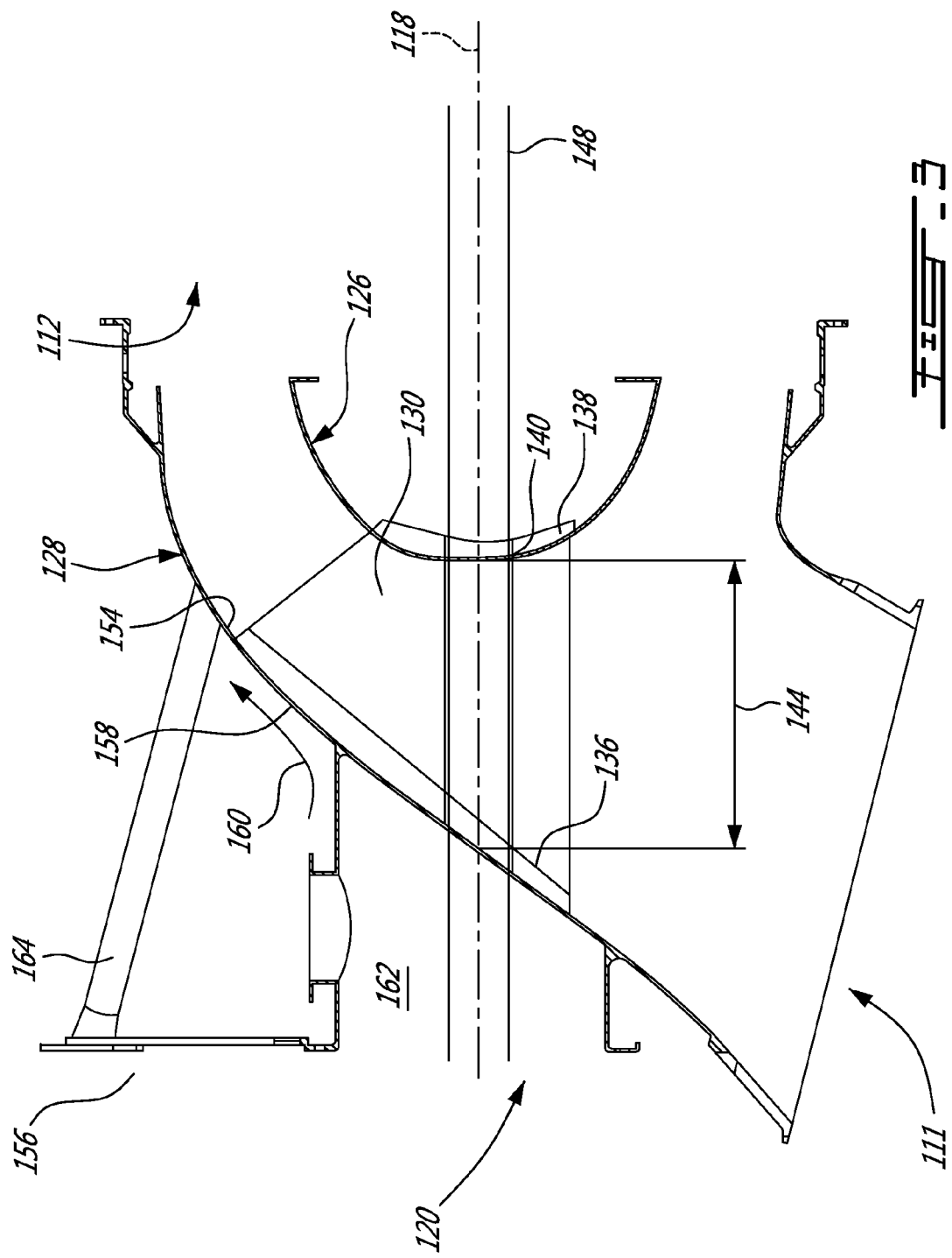
FIG. 3 is a cross-sectional view of an inlet section of a gas turbine engine, in accordance with another embodiment.

As will now be detailed, two examples of inlet assemblies are provided: FIG. 2 shows an example of an inlet assembly for a turboshaft engine having a radial inlet, and FIG. 3 shows an example of an inlet assembly for a turboprop engine having a slanted inlet.

Figure 1:
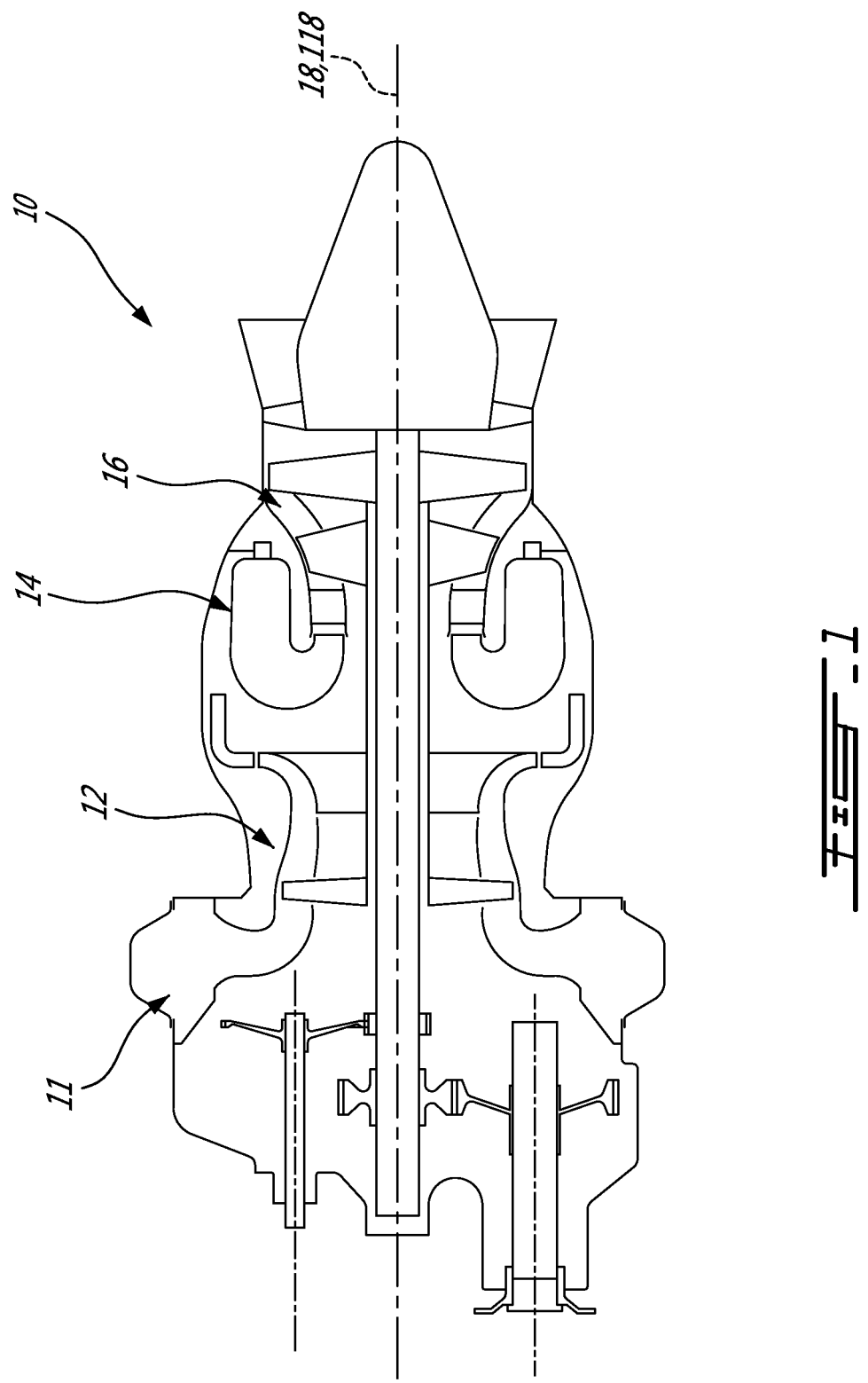
FIG. 1 is a schematic cross-sectional view of a gas turbine engine.

FIG. 1 illustrates an example of a turbine engine. In this example, the turbine engine 10 is a turboshaft engine generally comprising in serial flow communication, a radial inlet section 11, a multistage compressor 12 for pressurizing the air, a combustor 14 in which the compressed air is mixed with fuel and ignited for generating an annular stream of hot combustion gases, and a turbine section 16 for extracting energy from the combustion gases. The compressor 12 and turbine section 16 revolve around a main axis 18 of the turbine engine, and the radial inlet section 11 can be understood to extend annularly around the main axis 18. The turbine engine terminates in an exhaust section.

FIG. 2 shows an enlarged view of an example of a radial inlet section 11. The radial inlet section 11 can be seen to have an inlet case 20 provided in the form of an assembly and having two axially spaced apart skins 22, 24 defining an intake duct therebetween, for circulating the intake air to the first compressor stage 12. More specifically, the inlet assembly 20 has two inlet case portions 26, 28—which will be referred to herein as the first inlet case portion 28 and the second inlet case portion 26, for convenience—and at least one strut 30. In a particular embodiment, a plurality of circumferentially interspaced struts 30 are provided across the annular intake duct.

In a particular embodiment, the first and second inlet case portions 28, 26 are formed of sheet metal. In another embodiment, the first and second inlet case portions 28, 26 may be made from multiple components such as a combination of forgings, sheet metal and parts machined from solid metal. Alternate manufacturing processes may be used, including, but not limited to, additive manufacturing.

The first and second inlet case portions 28, 26 each define a respective one of the skins 24, 22. In the embodiment shown, the first inlet case portion 28 includes a radially-outer case portion 32 and a radially-inner case portion 34 having edges butt-welded to one another so as to together define a C-shaped cross-section. The radially-outer case portion 32 includes flanges shaped to fit and interconnect with adjacent components of the engine. The radially-inner case portion 34 has a radial or substantially radial outer edge welded to the radially-outer case portion 32, and an axial or substantially axial inner edge 48 welded directly to an edge of a compressor shroud 50 of the compressor 12. The second inlet case portion 26 defines the skin 26 as a single piece having an S-shaped cross-section. Alternately, the first inlet case portion 28 may be manufactured as a single piece, or may include two or more portions interconnected through any adequate type of connection, including but not limited to welding, and/or the second inlet case portion 26 may include two or more portions interconnected through any adequate type of connection.

The first inlet case portion 28 receives a proximal end 36 of each strut 30 in a manner to make it integral thereto. In the embodiment shown, the radially-outer case portion 32 includes a pedestal 46 protruding from the skin 24 for each strut 30, and the proximal end 36 of the respective strut 30 is butt-welded thereto. Alternate configurations and types of connections are also possible.

The distal end 38 of each strut 30 extends away from the first inlet case portion 28 along the axial direction 18, and protrudes into a respective strut-receiving aperture 40 (which can be one of a plurality of radially extending circumferentially interspaced slots for instance) of the second inlet case portion 26. In the embodiment shown, each strut 30 has a radial orientation within the intake duct.

The penetration distance of the distal end 38 of each strut 30 into the respective strut-receiving aperture 40 affects the length 42 of the portion of the strut 30 which extends between the two inlet case portions 26, 28, and the length 42 of the portion of the strut(s) 30 which extend(s) between the two inlet case portions 26, 28 controls the inlet throat dimension 44, which in the embodiment shown in defined as an axial dimension of the intake duct or distance between inner surfaces of the inlet case portions 26, 28. Henceforth, during assembly, the inlet throat dimension 44 can be precisely adjusted by adjusting the relative positions of the first inlet case portion 28 and the second inlet case portion 26 through adjustment of the penetration distance of the distal end 38 of the strut(s) 30 into the strut-receiving aperture(s) 40 so that a desired throat dimension 44 is obtained, after which the first and second inlet case portions 28, 26 are maintained in their relative positions. The precisely adjusted inlet throat dimension 44 is then set, e.g. permanently locked, by connecting each strut 30 to the second inlet case portion 26 so as to fix their relative position. In a particular embodiment, the strut(s) 30 and second inlet case portion 26 are connected through fillet-welding. Alternate methods may be used to connect the strut(s) 30 and second inlet case portion 26, including, but not limited to, brazing or mechanical fastener(s) (e.g. bolt, rivet) with an adjustable spacer to set the throat dimension.

It will be understood that the expressions first and second are used here simply for the sake of convenience, and that the selected one of the inlet case portions 26, 28 to which each strut 30 is subsequently connected can be interchanged in alternate embodiments.

In a particular embodiment, the inlet case portions 26, 28, strut(s) 30, and compressor shroud 50 are all made of steel, though it will be understood that other materials may be used, and in particular in embodiments where these elements are interconnected through welding, other suitable weldable metals.

Double wall structures can also be incorporated in the case assembly 20, such as to control case stiffness and/or heat transfer at selected locations. For instance, in the specific embodiment shown, a double wall structure 52 is incorporated to the external elbow section of the second inlet case portion 26.

In the particular embodiment where the inlet case portions 26, 28 are made of weldable material, the double walled structure 52 can be directly welded thereon, and the inlet assembly 20 can be directly welded to the compressor shroud 50, thereby avoiding the use of fasteners—which can help achievement of a satisfactory weight of the engine.

FIG. 3 shows an alternate embodiment of an inlet assembly 120. In FIG. 3, the inlet assembly 120 is adapted to a turboprop gas turbine engine having a slanted inlet section 111. The inlet assembly 120 includes a first inlet case portion 128 which, in this example, is a main inlet case portion forming an elbowed duct leading to the first axial compressor stage 112. A strut 130 extends axially from an internal face 154 of the main inlet case portion and has a proximal end 136 made integral therewith, for example through welding. The inlet assembly 120 also includes a second inlet case portion 126 which, in this example, is a non-structural inlet fairing. The inlet fairing has a strut-receiving aperture 140 defined around a position of the main axis 118 of the engine, and into which a distal end 138 of the strut 130 is engaged. Similarly to the embodiment described above, the inlet throat dimension 144 can be precisely controlled upon assembly by precisely adjusting the penetration distance of the distal end 138 of the strut 130 into the inlet fairing 126 before attaching the strut 130 thereto, which can allow to compensate for weld shrinkages and manufacturing tolerances, for instance. It will be understood that in this embodiment, the strut 130 acts as an aerodynamic housing for the engine shaft 148 which extends from the compressor section 112 of the core engine to a gearbox 156, and the inlet fairing forms an internal portion of the walls defining the inlet flow path, smoothly directing the incoming airflow around the shaft area and into the compressor vanes.

In the specific embodiment shown in FIG. 3, the first inlet case portion 128 is designed for engine loads 160 to be directed along its external skin 158, which in a particular embodiment eliminates the need for radial structural struts. A torque tube 162 which prolongs the shaft housing between the strut 130 and the gearbox 156 can be attached directly (e.g. welded) to the external skin 158 of the first inlet case portion 128 rather than to an inner hub of the assembly.

In a particular embodiment, the welded assembly further incorporates two bending moment control tubes 164, the precise length of which is adjusted before the tubes 164 are welded to the first inlet case portion 128 to form an integral part of the inlet case. In a particular embodiment, such a configuration allows for the use of fixed-length control tubes rather than variable length control tubes which may allow for control tubes having a lower weight.

The above description is meant to be exemplary only, and one skilled in the art will recognize that changes may be made to the embodiments described without departing from the scope of the invention disclosed. For instance, individual components forming the inlet case portions can be made from sheet metal, machining, additive manufacturing, etc. Still other modifications which fall within the scope of the present invention will be apparent to those skilled in the art, in light of a review of this disclosure, and such modifications are intended to fall within the scope of the appended claims.

The invention claimed is:

1. A method of fabricating an inlet assembly for a gas turbine engine, the method comprising:
   defining an intake duct of the inlet assembly between first and second spaced apart inlet case portions;
   locating at least one strut across the intake duct, each strut having a proximal end made integral to the first inlet case portion and an opposed distal end engaged in a respective strut-receiving aperture defined through the second inlet case portion;
   while maintaining the distal end of each strut in the respective strut-receiving aperture, adjusting a penetration distance of the distal end in the respective strut-receiving aperture to adjust an axial distance between the first inlet case portion and the second inlet case portion until the axial distance corresponds to a predetermined throat dimension; and
   locking the adjusted axial distance by attaching the second inlet case portion to each strut.

2. The method as defined in claim 1, wherein attaching the second inlet case portion to each strut includes welding the distal end of each strut to the second inlet case portion.

3. The method as defined in claim 1, further comprising making the proximal end of each strut integral to the first inlet case portion through welding.

4. The method as defined in claim 3, further comprising butt welding the proximal end of each strut to a respective pedestal extending from a skin of the first inlet case portion.

5. The method as defined in claim 1, further comprising welding at least another part of the gas turbine engine to one of the first inlet case portion and the second inlet case portion.

6. The method as defined in claim 1, wherein one of the first and second inlet case portions is a structural component, the method further comprising: welding at least one bending moment control tube to the structural component.

7. An inlet assembly for a gas turbine engine, the inlet assembly comprising:
   at least first and second spaced apart inlet case portions defining an intake duct therebetween; and
   at least one strut extending across the intake duct and having a proximal end made integral to the first inlet case portion and a distal end engaged in a respective strut-receiving aperture defined through the second inlet case portion, a relative position of the first and second inlet case portions being fixed through a connection between each of the at least one strut and the second inlet case portion, a length of a portion of each of the at least one strut defined along a direction extending between the distal and proximal ends, wherein the length extends between the inlet case portions, and the length of the portion of each of the at least one strut controlling a throat dimension of the intake duct, wherein the length of the portion of each of the at least one strut and the throat dimension are defined along an axial direction of the inlet assembly.

8. The inlet assembly as defined in claim 7, wherein the connection between each of the at least one strut and the second inlet case portion includes a filet-weld between the second inlet case portion and the distal end of the strut.

9. The inlet assembly as defined in claim 7, wherein the proximal end of each of the at least one strut is butt-welded to the first inlet case portion.

10. The inlet assembly as defined in claim 7, wherein the at least one strut includes a plurality of circumferentially spaced apart struts.

11. The inlet assembly as defined in claim 7, wherein the at least one strut includes a single central strut having a hollow configuration configured to receive a shaft of the engine therethrough.

12. The inlet assembly as defined in claim 11, wherein the first case portion has a torque tube of the gas turbine engine made integral thereto and extending in axial alignment with the strut away from the intake duct, the torque tube having a hollow configuration configured to receive the shaft of the engine therethrough.

13. The inlet assembly as defined in claim 12, further comprising bending moment control tubes having an end welded to the first case portion.

14. The inlet assembly as defined in claim 7, wherein the intake duct defines a radial inlet and the throat dimension is defined as an axial distance between the first and second inlet case portions.

15. The inlet assembly as defined in claim 7, wherein at least one of the first and second inlet case portions has an outer skin made integral to an inner skin thereof such as to defined a double skin.

16. The inlet assembly as defined in claim 7, wherein the intake duct defines an inlet slanted with respect to a radial direction of the gas turbine engine, and the second case portion defines an inlet fairing.

17. A gas turbine engine comprising:
    an inlet assembly including at least first and second spaced apart inlet case portions defining an intake duct therebetween; and
    at least one strut extending across the intake duct and having a proximal end made integral to the first inlet case portion and a distal end engaged in a respective strut-receiving aperture defined through the second inlet case portion, a relative position of the first and second inlet case portions being fixed through a connection between each of the at least one strut and the second inlet case portion, a length of a portion of each of the at least one strut defined along a direction extending between the distal and proximal ends, wherein the length extends between the inlet case portions, and the length of the portion of each of the at least one strut controlling a throat dimension of the intake duct, wherein the length of the portion of each of the at least one strut and the throat dimension are defined along an axial direction of the gas turbine engine.

18. The gas turbine engine as defined in claim 17, wherein the connection between each of the at least one strut and the second inlet case portion includes a filet-weld between the second inlet case portion and the distal end of the strut.

19. The gas turbine engine as defined in claim 17, wherein each of the inlet case portions is welded to at least one other component of the gas turbine engine.

20. An inlet assembly for a gas turbine engine, the inlet assembly comprising:

at least first and second spaced apart inlet case portions defining an intake duct therebetween; and at least one strut extending across the intake duct and having a proximal end made integral to the first inlet case portion and a distal end engaged in a respective strut-receiving aperture defined through the second inlet case portion, a relative position of the first and second inlet case portions being fixed through a connection between each of the at least one strut and the second inlet case portion, a length of a portion of each of the at least one strut extending between the inlet case portions controlling a throat dimension of the intake duct;

wherein the first case portion has a torque tube of the gas turbine engine made integral thereto and extending in axial alignment with the strut away from the intake duct, the torque tube having a hollow configuration configured to receive the shaft of the engine therethrough.

21. The inlet assembly as defined in claim 20, further comprising bending moment control tubes having an end welded to the first case portion.

\* \* \* \* \*